United States Patent [19]

Hoffman

[11] Patent Number: 4,466,851

[45] Date of Patent: Aug. 21, 1984

[54] METHOD AND APPARATUS FOR SCRAPING ADHERENT MATERIAL FROM A SMOOTH WORK SURFACE

[75] Inventor: Brent K. Hoffman, Salt Lake County, Utah

[73] Assignee: Linear Pneumatics Inc., Salt Lake City, Utah

[21] Appl. No.: 466,893

[22] Filed: Feb. 16, 1983

Related U.S. Application Data

[60] Continuation of Ser. No. 285,753, Jul. 22, 1981, abandoned, which is a division of Ser. No. 065,984, Aug. 13, 1979, abandoned.

[51] Int. Cl.$^3$ .............................................. B32B 31/18

[52] U.S. Cl. ...................................... 156/344; 29/275; 29/426.5; 30/169; 30/277; 81/463; 156/584; 173/132; 173/169

[58] Field of Search ................. 29/426.5, 275; 30/169, 30/277; 81/1 N, 463, DIG. 12; 156/344, 584; 277/235 B; 173/132, 133, 169

[56] References Cited

U.S. PATENT DOCUMENTS 2,503,539 4/1950 Aspeek ................................. 30/169

2,655,921 10/1953 Haboush .......................... 81/463 X

*Primary Examiner*—Robert A. Dawson

*Attorney, Agent, or Firm*—Mallinckrodt & Mallinckrodt

[57] ABSTRACT

A pneumatic impact tool has a tubular housing with an impact head secured in and extending outwardly from one end of the housing and a valve secured within the housing but spaced from the impact head so that a piston chamber is formed within the housing. The valve has an inlet port adapted to be connected to a source of pressurized fluid and two outlet ports for the alternate release, respectively, of pressurized fluid. One outlet port opens directly into the piston chamber while the other is connected by a passage to the piston chamber immediately adjacent the impact head. At least one exhaust port is provided through the housing for exhausting pressurized fluid from the piston chamber when the piston reaches the end of its travel in each direction of its stroke. The housing is adapted to be connected to a source of pressurized fluid so that pressurized fluid enters the inlet port of the valve. The impact head is adapted to have an implement attached thereto for performing certain jobs such as removing stuck gaskets from engine blocks and the like.

11 Claims, 3 Drawing Figures

METHOD AND APPARATUS FOR SCRAPING ADHERENT MATERIAL FROM A SMOOTH WORK SURFACE

This is a continuation of application Ser. No. 285,753, filed July 22, 1981 which is in turn a division of Ser. No. 65,984, filed Aug. 13, 1979, both now abandoned.

BACKGROUND OF THE INVENTION

1. Field

The invention is in the field of pneumatic impact tools, and is particularly concerned with methods of removing stuck gaskets from engine blocks and the like.

2. State of the Art

In the repair of automobile and other types of engines it is sometimes necessary to remove the cylinder head from the engine block or to remove other parts which are sealed using a gasket. In most cases, the gasket sticks to one or the other of the pieces or to both and then must be removed before a new one can be installed. Present practice is normally to remove the gasket with a hand chisel with or without a hammer, or by chemical means using an acid solution. Using a chisel is time consuming, and, if the chisel is not held correctly, damage may result to the engine block or to the person using the chisel. Using an acid solution requires precautions to avoid getting the solution on areas other than the gasket and to avoid getting the solution on the user.

Conventional power chisels cannot be used satisfactorily for removing stuck gaskets, because the stroke of the chisel blade is too long and powerful and may damage the engine block. Further, a blade moving in relation to the tool itself makes the tool very difficult to control. In such cases, the tool tends to jump around during use, thereby further damaging the engine block and allowing the blade thereon to rotate. No small, hand-held impact tool has been available which will produce between about 8 and 20 pounds of impact, that is easily controllable and manipulated, and that has a blade suitable for use in removing gaskets.

SUMMARY OF THE INVENTION

According to the invention, a pneumatic impact tool particularly useful for removing stuck gaskets from engine blocks and the like includes an inner tubular housing having an impact head secured in one end thereof and a valve for regulating flow of pressurized fluid spaced from the impact head so as to form a piston chamber within the housing. The valve has an inlet port adapted to be connected to a source of pressurized fluid and two outlet ports for the alternate release, respectively, of pressurized fluid, one of said outlet ports opening directly into the piston chamber. A first port is provided through the housing which mates with the other valve outlet port and which is connected by a groove or flattened area on the outer surface of the housing with a second port through the housing which opens into the piston chamber immediately adjacent to the impact head. An outer tubular housing fits snugly about the inner housing so that the groove or flattened area forms a passageway between the first and second ports for the passage of pressurized fluid. A source of pressurized fluid is connected to the housing so that it enters the valve and is alternately fed to opposite ends of the piston chamber to cause a freely slideable piston therein to reciprocate. Exhaust ports are arranged so that the piston impacts against the impact head during one direction of the stroke of the piston but stops short of the end of the piston chamber during the reverse direction of the stroke of the piston. This causes impact in one direction only.

A blade or other implement is rigidly secured to the impact head of the tool to perform a desired job. For removing a stuck gasket, it is preferred that a blade whose blade-edge-defining surfaces are beveled from respectively opposite blade faces be used. One bevel rests on the engine block or other surface to which the gasket is attached and the blade may then be directed forwardly against the gasket.

THE DRAWINGS

In the accompanying drawings, which represent the best mode presently contemplated for carrying out the invention:

FIG. 1 is a pictorial view of the invention showing it in use for removing a stuck gasket from an engine block;

FIG. 2, a longitudinal axial section taken through the tool of FIG. 1 as disconnected from the air hose and showing the piston against the impact head; and FIG. 3, a longitudinal axial section taken at ninety° to that of FIG. 2 and showing the piston at the opposite end of its stroke, the tool-carrying end of the impact head being shown in elevation.

DETAILED DESCRIPTION OF THE ILLUSTRATED EMBODIMENT

Figure 2:
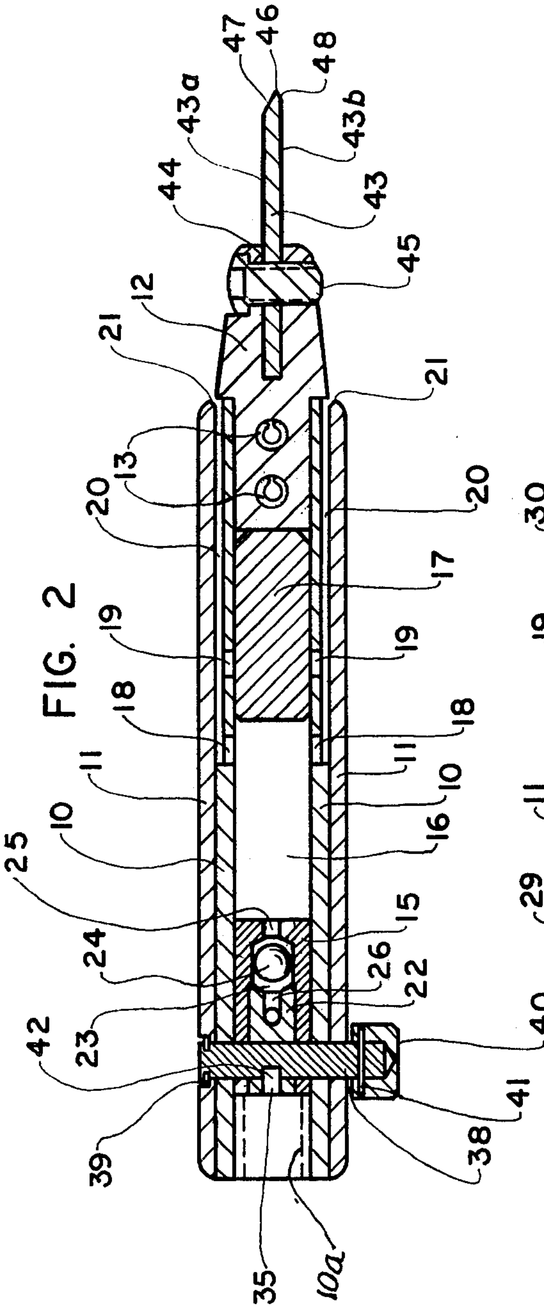
Figure 3:
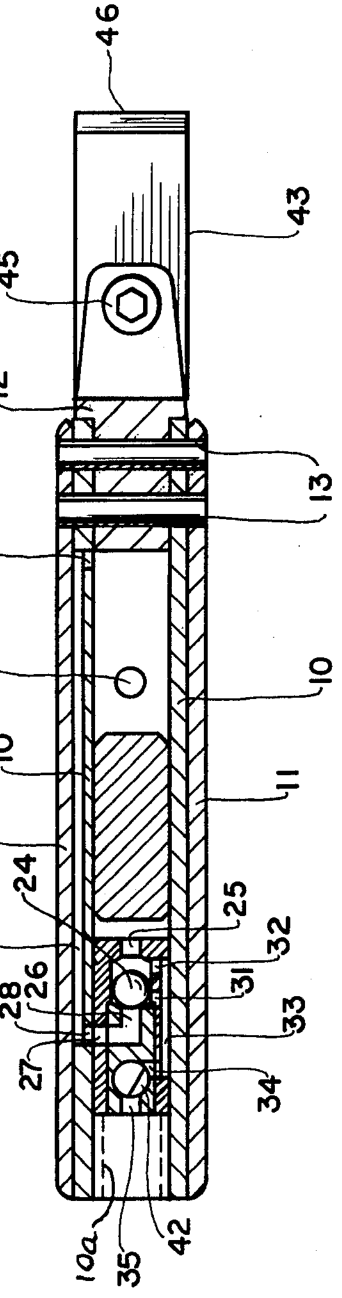

The illustrated embodiment of pneumatic impact tool of the invention has an inner tubular housing 10, FIGS. 2 and 3, surrounded by a snugly fitting, outer tubular housing 11. An impact head 12 is secured in one end of the inner tubular housing 10 by means of rollpins 13.

Fitted snugly within the inner tubular housing 10 and spaced from the impact head 12 is a valve housing 15. A piston chamber 16 is formed within tubular housing 10 between impact head 12 and valve housing 15, within which a piston 17 is free to slide. Respective sets of exhaust ports 18 and 19 extend through housing 10 to grooves or flattened areas 20 on the outer surface of housing 10. Each set of exhaust ports preferably has two ports located on respectively opposite sides of the housing, as shown in FIG. 2. The respective sets 18 and 19 are displaced from each other longitudinally along the length of the housing.

The grooves or flattened areas 20 extend from the innermost exhaust ports 18 on each side of the housing to the forward end of the housing, where they open to the atmosphere between outer housing 11 and impact head 12. Outer housing 11 is chamfered at its forward end about its inner edge 21 to facilitate the opening of the grooves or flattened areas 20 to the atmosphere.

Figure 1:
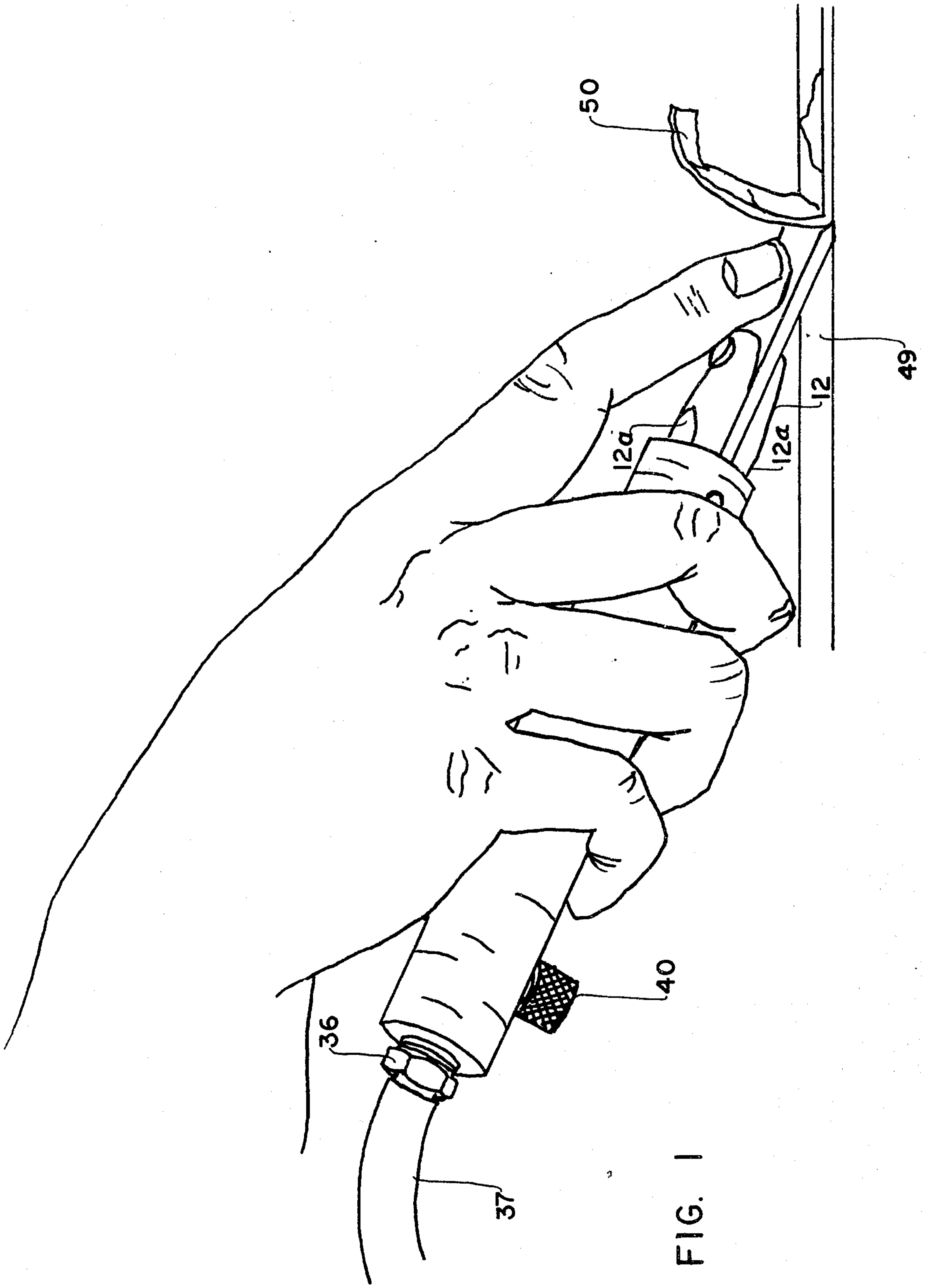

While the arrangement illustrated is preferred, flattened areas 12*a*, FIG. 1, could be provided on the impact head to correspond with flattened areas 20 on the inner housing. It is preferred to have the exhaust fluid exit at the front of the tool to blow away any debris that is formed during the use of the tool so that the working area is kept clear. It is also preferable to route the exhaust fluid through a passage rather than directly out into the atmosphere because it makes operation of the tool more quiet.

A valve means is formed by hollow valve housing 15 with valve insert 22 within one end of such housing, so that a valve chamber 23 is formed. A valve ball 24 is located within valve chamber 23. An outlet port 25 opens from the center of one end of the valve chamber directly into piston chamber 16, and a passage 26 extends from the center of the opposite end of valve chamber 23 to intersect a port 27 that extends to the outside of the valve body 15. Port 27 in valve body 15 mates with port 28 through inner housing 10 which connects with a groove or flattened area 29 that extends from port 28 longitudinally along the surface of inner housing 10 to a port 30. Port 30 extends from the groove or flattened area 29 through inner housing 10 to the piston chamber 16 immediately adjacent to impact head 12. With outer housing 11 in place, the groove or flattened area 29 forms a closed passageway between ports 28 and 30. Seats for ball 24 are provided at opposite ends of the valve chamber 23 about port 25 and passage 26, respectively.

Valve inlet ports 31 and 32 extend from a groove or flattened area 33 on the outside of valve housing 15, through the valve housing to the respective end of valve chamber 23. The other end of the groove or flattened area 33 connects with a passage 34 which intersects a passage 35. Passage 35 opens into the end of inner housing 10. The end of inner housing 10 is adapted to be connected to a source of pressurized fluid, such as to the usual compressed air line. For this purpose, the inside walls of the inner housing next to the valve may be threaded, as at **10*a*, so that a normal screw fitting, 36, FIG. 1, of an air hose 37, may be easily connected. A valve stem 38 extends through the housings and the intersection of passages 34 and 35. Valve stem 38 is secured in place by an E clip 39 on one end and knob 40 secured to the other end by pin 41. A slot 42 is located on stem 38 at the intersection of passages 34 and 35. As stem 38 is rotated, the slot moves from a position where stem 38 completely blocks the intersection of passages 34 and 35, to a position as shown in FIG. 3, where the slot interconnects passages 34 and 35 for flow of pressurized fluid. At positions in between, fluid flow is restricted to various degrees. With valve body 15 snugly fitted into tubular inner housing 10, flattened area 33 forms a closed passage for the flow of pressurized fluid from passage 34 to valve inlet ports 31 and 32**.

During operation of the tool, pressurized fluid, preferably compressed air, is fed to valve chamber 23 via inlet ports 31 and 32. Piston 17 reciprocates within piston chamber 16, alternately uncovering exhaust ports 18 and exhaust ports 19 at respective ends of its stroke. With the piston as shown in FIG. 2, exhaust ports 18 are uncovered, thereby opening the piston chamber on the valve side of the piston to the atmosphere. This causes minimum pressure through valve outlet port 25. With this minimum pressure, the pressurized fluid through inlet port 31 tends to move ball 24 away from outlet passage 26 toward outlet port 25. Since exhaust ports 19 are blocked, pressure can build up in the piston chamber adjacent impact head 12. This pressure also builds up in port 30, passage 29, ports 28 and 27 and passage 26 leading from the valve to the piston chamber. This build up of pressure causes ball 24 to move against port 25 thereby blocking it. The piston 17 is beveled about its edge so that there is space for the pressurized fluid to enter the piston chamber even with the piston against the impact head. With port 25 blocked and passage 26 open, pressure builds up in the piston chamber and causes the piston to move in the piston chamber toward the valve. As the piston moves, it uncovers exhaust ports 19. The pressure in the piston chamber is relieved causing ball 24 in the valve to shift in a fashion similar to that described above, to a position as shown in FIG. 3, so that passage 26 is blocked and port 25 is open. This causes the pressure to build up between the valve and piston so that the piston changes its direction of travel and moves towards the impact head.

The exhaust ports are located so that the piston will impact against the impact head when traveling toward it, but when traveling in the opposite direction, the piston will be stopped and its direction changed without impacting against the valve or any other part of the tool. Thus, impact is given to the tool in one direction only as the piston strikes the impact head.

The impact head is adapted to have a blade or other implement attached thereto. As illustrated, a blade 43 fits into a slot 44 in the impact head and is secured in place by a cap bolt 45. The blade shown is specifically adapted for removing gaskets from engine blocks or the like to which they often stick, and has a blade edge 46 defined by two surfaces 47 and 48 that are beveled from the respective opposite blade faces **43*a* and 43*b*. It is preferred that both surfaces 47 and 48 be beveled at angles of 30° from surfaces 43*a* and 43*b*** respectively.

For removing gaskets, the tool is placed on an engine block or similar item 49, FIG. 1, from which a stuck gasket 50 is to be removed. With the tool operating, it is held with a beveled surface 47 or 48 of the blade 43 flat against the work surface 49 and is pushed along such work surface against the gasket to be removed. The gasket peels away from the engine block as illustrated. The bevel surface allows the tool to be held at an angle to the block, as shown, yet still have a flat surface in contact with the block. In this way, the blade edge 46 and impact of the tool is directed to the engine block-gasket interface rather than to the block itself and does not cause damage to the block.

With the impact head secured to the tool so that it cannot move apart from the tool itself, the impact is imparted to the tool as a whole rather than to the blade individually. This limits the potential stroke of the tool and makes it very easy to manipulate and control. The impact can be very carefully directed, and the tool will not jump around on the surface being worked on.

With the tool illustrated, the piston stroke is about 1.25 inches. The piston weighs about one ounce in relation to the tool's total weight of about 28 ounces. The tool is preferably operated with compressed air of 90 pounds per square inch which causes the piston to complete about 4800 strokes per minute. The total impact produced by the tool is preferably between eight and twenty pounds with about seventeen pounds being preferred. Below about eight pounds of impact the tool has no effective input over and above the normal hand chisel. Above about twenty pounds of impact, the tool becomes difficult to control and may cause damage to the item being worked on.

The actual impact and frequency of the piston stroke may be varied by varying the amount and pressure of fluid to the tool. This may be adjusted by turning knob 40 which, as described above, controls the fluid flow to the valve. It will also vary with the pressure of the supply. Thus, if the pressure of the supply is less than the preferred 90 pounds per square inch, the frequency of the piston stroke will be less and the impact less. Wide variations in supply pressures are usable, however.

The dimensions of the tool will also affect its performance. If the weight of the piston is changed or the length of the stroke of the piston is changed, the impact produced and frequency of piston stroke at a given fluid pressure will be different. Thus, the tool can be designed to operate effectively on various input pressures. The total size and weight of the tool, of course, affects its maneuverability so must be considered in any changes made.

The construction described, utilizing an inner tubular housing and outer tubular housing along with ports through the inner tubular housing and grooves or flattened areas on the surface of the inner tubular housing to form passages, is preferred because of the ease of manufacturing the tool in that manner. The drilling of the ports is a straight forward operation as is the machining of the grooves or flattened areas. Such procedures eliminate the need for drilling or otherwise providing longitudinal passages within the walls of the housing or for providing external tubes or hoses.

The preferred embodiment has been described as having two sets of exhaust ports. This allows a tool with the proportions illustrated to operate as described. In some circumstances, where the length of the piston chamber is greater in proportion to the length of the piston than that illustrated, only one set of exhaust ports is necessary. Further, while a set of exhaust ports has been described and illustrated, a single exhaust port where a set has been indicated is satisfactory. The two ports making up a set are preferred because they provide greater exhaust capacity.

The tool has been illustrated and described with reference to an embodiment particularly adapted for use in removing gaskets. It will be obvious, however, that the tool can be used in numerous other applications, some similar to removing gaskets, such as the separation of materials along an interface, or some dissimilar, such as carving wood. In certain applications, the implement attached to the tool will be different than the one shown. A wide variety of implements can be used with the tool depending upon the desired use.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of scraping adherent material from a smooth work surface, comprising placing the working end of a chisel-like blade, having a blade edge extending transversely of the blade and defined by at least one beveled blade surface, with its said blade surface flat against said work surface; lightly tapping the opposite end of said blade by a hand-held pneumatic impact tool having an impact head rigidly secured to the tool body against movement relative thereto and operating at high frequency such as will free the adherent material without scratching or otherwise marring said work surface, said blade and said tool body being rigidly interconnected against relative movement to move in unison under the influence of said tapping impact; and pushing said impact tool and its said blade along said work surface while keeping said beveled blade surface flat thereaginst to separate said adherent material from said work surface at its interface, therewith.

2. A method in accordance with claim 1, wherein the beveled blade surface is at an angle of about 30° to one face of the blade.

3. A method according to claim 1, wherein the blade edge is defined by surfaces that are beveled from respectively opposite blade faces, and wherein one of the beveled surfaces rests on the work surface when the tool is held at an angle to such work surface.

4. A method in accordance with claim 1, wherein the work surface is the gasketed surface of an engine block and the adherent material is a gasket.

5. A method in accordance with claim 1, wherein the power impact tool provides from about 8 to about 20 pounds of impact force.

6. A method in accordance with claim 1, wherein the operating frequency of the power impact tool is about 4800 strokes per minute.

7. In a pneumatic tool having a tool body adapted to be easily held in and manipulated by one hand of the user and having an impact head fixedly secured thereto against relative movement, piston means for exerting successive impacts against said head, and means for introducing and exhausting a pneumatic fluid into and from said tool body for causing said piston means to rapidly and repeatedly impact said head, the combination therewith of an implement in the form of a blade fixedly secured to said impact head against relative movement, said blade having a blade edge defined by at least one beveled blade surface adapted to be held flat against a smooth work surface, said blade edge extending transversely of the blade so that said tool can be used to separate tightly adherent material from said work surface without marring said surface.

8. The combination set forth in claim 7, wherein the size and weight of the piston and the stroke of the piston are designed to provide impact of the piston against the impact head within the range of about eight and twenty pounds when the tool is operated with pressurized fluid under normal operating pressure of about ninety pounds per square inch.

9. The combination set forth in claim 8, wherein the operating frequency of the tool is about 4800 strokes per minute.

10. The combination set forth in claim 7, wherein the at least one beveled blade surface is beveled from a blade face at an angle of about 30° so that such beveled surface is adapted to rest on the smooth work surface when the blade is positioned at an acute angle to said work surface.

11. The combination set forth in claim 10, wherein the blade edge is formed by opposite blade surfaces beveled, respectively, from opposite blade faces.

* * * * *